3,264,305
1-(2-ALKENYLOXY)CARBOSTYRILS

Leo A. Paquette, Portage Township, Kalamazoo County, Mich., assignor to the Upjohn Company, Kalamazoo, Mich., a corporation of Delaware
No Drawing. Filed Sept. 16, 1963, Ser. No. 309,307
2 Claims. (Cl. 260—289)

This invention relates to novel compositions of matter and to methods for producing them. In particular, this invention relates to novel 1-(2-alkenyloxy)carbostyrils of the formula:

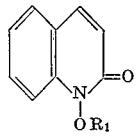

wherein $R_1$ is 2-alkenyl of 3 to 8 carbon atoms, inclusive.

Examples of 2-alkenyl of 3 to 8 carbon atoms, inclusive, are allyl, 1-methylallyl, 2-methylallyl (methallyl), 2-butenyl (crotyl), 1,2-dimethylallyl, 2-ethylallyl, 1-methyl-2-butenyl, 2-methyl-2-butenyl, 3-methyl-butenyl, 2-pentenyl, 2,3-dimethyl-2-butenyl, 1,3-dimethyl-2-butenyl, 1-ethyl-2-butenyl, 4-methyl-2-pentenyl, 2-hexenyl, 4,4-dimethyl-2-pentenyl, 2-heptenyl, 2-octenyl, 1,4-dimethyl-2-hexenyl, and the like.

The novel 1-(2-alkenyloxy)carbostyrils of Formula I have demonstrated anti-inflammatory activity as shown by the granuloma pouch technique in rats, and are useful in treating inflammatory conditions topically, locally, and systemically in mammals, e.g., humans, cattle, horses, dogs, and cats, and in birds, e.g., poultry. Tests with animals have also shown these compounds to have sedative, anticonvulsant, and muscle relaxant effects, and the compounds are therefore useful for those purposes.

The novel Formula I compounds are useful for the treatment of topical fungal infections in mammals, e.g., humans, cattle, horses, dogs, and cats, and in other animals, caused by fungi such as *Microsporum canis* and *Trichophyton rubrum*, or for eradicating such fungi from inanimate objects. Also, they are useful in the treatment of plant infections caused by such fungi as *Alternaria solani, Fusarium oxysporum* var. *cubense*, and *Sclerotinia fructicola*. These compounds also inhibit the action of Newcastle disease virus on chick embryo cells.

The novel compounds of Formula I are basic and exists either in the non-protonated (free base) form or in the protonated (acid addition salt) form depending on the pH of the environment. They form stable protonates, i.e., acid addition salts, on neutralization with suitable strong acids, for example, hydrochloric, hydrobromic, sulfuric, phosphoric, nitric, methanesulfonic, picric, trichloroacetic acids, and the like. These acid addition salts are useful for upgrading the free bases.

The novel Formula I compounds form salts with fluosilicic acid which are useful as mothproofing agents according to U.S. Patents 1,915,334 and 2,075,359. They also form salts with thiocyanic acid which condense with formaldehyde to form resinous materials useful as pickling inhibitors according to U.S. Patents 2,425,320 and 2,606,155.

The novel 1-(2-alkenyloxy)carbostyrils of Formula I are prepared by reacting a quinoline 1-oxide of the formula:

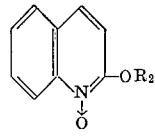

wherein $R_2$ is alkyl of 1 to 3 carbon atoms, inclusive, with a 2-alkenyl halide of the formula, $R_1X$, wherein $R_1$ is as defined above and X is selected from the group consisting of chloride, bromide, and iodide. Examples of alkyl of 1 to 3 carbon atoms, inclusive, are methyl, ethyl, and propyl.

Quinoline 1-oxides of Formula II are either known in the art or can be prepared by methods known in the art [e.g., J. Chem. Soc. 1864–6 (1948); J. Chem. Soc. 2091–4 (1949)].

2-alkenyl halides of the formula $R_1X$ are either known in the art or can be prepared by methods known in the art. See, for example, Chem. Rev. 56, 753–901 (1956). Examples of suitable halides are the chlorides, bromides, and iodides of the specific 2-alkenyl moieties given above.

The reaction between a Formula II quinoline 1-oxide and a 2-alkenyl halide is carried out by mixing these two reactants and heating in the range about 25° to about 125° C., preferably in the range about 40° to about 75° C., for about 1 to about 10 hours. At least one mole of 2-alkenyl halide should be mixed with each mole of quinoline 1-oxide, and it is preferred to use an excess, for example, about 2 to about 20 moles, of those halides with relatively low boiling points and likely to be lost by evaporation during the reaction. Although it is preferred to carry out the reaction in the absence of a diluent, especially when the reaction mixture is a homogenous liquid at the reaction temperature, an inert liquid diluent, for example, a hydrocarbon or an ether of the appropriate boiling point can be used. Examples of suitable diluents are benzene, toluene, xylene, cyclohexane, diethyl ether, dibutyl ether, and the like. The desired 1-(2-alkenyloxy)carbostyril can be isolated from the reaction mixture and purified by conventional techniques, for example, by fractional distillation, recrystallization, or chromatography.

The invention can be more fully understood by the following examples.

EXAMPLE 1

*1-allyloxycarbostyril*

A mixture of 2-ethoxyquinoline 1-oxide monohydrate (9.0 g.; 0.043 mole) and allyl bromide (50 ml.; 0.58 mole) was refluxed 1.5 hours. The small amount of solid which formed was removed by filtration. The filtrate was distilled at reduced pressure to give 5.7 g. of a pale yellow oil; B.P. 135° C. at 0.13 mm. After standing overnight, the distillate crystallized. Two recrystallizations from hexane gave 1-allyloxycarbosytril as a fluffy white solid, M.P. 43–44° C.

*Analysis.*—Calcd. for $C_{12}H_{11}NO_2$: C, 71.62; H, 5.51; N, 6.96. Found: C, 71.97; H, 5.62; N, 6.98.

U.V.: ($C_2H_5OH$) 229 m$\mu$ ($\epsilon$=39,450); sh. 245 m$\mu$ ($\epsilon$=8,050); 217 m$\mu$ ($\epsilon$=7,000); sh. 277 m$\mu$ ($\epsilon$=6,350); sh. 316 m$\mu$ ($\epsilon$=4,800); 327 m$\mu$ ($\epsilon$=5,750); sh. 342 m$\mu$ ($\epsilon$=4,200).

I.R. (principal band; undiluted): 1663 cm.$^{-1}$.

Following the procedure of Example 1 but using in place of allyl bromide, methallyl chloride; crotyl chloride; 2-ethylallyl bromide; 2-pentenyl bromide; 2,3-dimethyl-2-butenyl chloride; and 2-heptenyl iodide, the corresponding carbostyrils are obtained.

Following the procedure of Example 1 but using in place of the combination allyl bromide and 2-ethoxyquinoline 1-oxide, allyl iodide and 2-methoxyquinoline 1-oxide; 1-methylallyl chloride and 2-methoxyquinoline 1-oxide; 1,2-dimethylallyl bromide and 2-propoxyquinoline 1-oxide; 1,3-dimethyl-2-butenyl bromide and 2-propoxyquinoline 1-oxide; 2-hexenyl chloride and 2-methoxyquinoline 1-oxide; and 2-octenyl chloride and 2-propoxyquinoline 1-oxide, the corresponding carbostyrils are obtained.

I claim:
1. A compound of the formula:
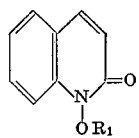
wherein $R_1$ is 2-alkenyl of 3 to 8 carbon atoms, inclusive.
2. 1-allyloxycarbostyril.
References Cited by the Examiner
Newbold et al.: J. Chem. Soc. (London), pp. 1864–6 (1948).
ALEX MAZEL, *Primary Examiner.*
HENRY R. JILES, NICHOLAS S. RIZZO, *Examiners.*
D. M. KERR, D. G. DAUS, *Assistant Examiners.*